United States Patent

[11] 3,555,986

| | | |
|---|---|---|
| [72] | Inventor | Gunter Pawlik<br>Munich, Germany |
| [21] | Appl. No. | 730,393 |
| [22] | Filed | May 20, 1968 |
| [45] | Patented | Jan. 19, 1971 |
| [73] | Assignee | AGFA-Gevaert Aktiengesellschaft<br>Leverkusen, Germany |
| [32] | Priority | May 24, 1967 |
| [33] | | Germany |
| [31] | | No. A-55802 |

[54] EXPOSURE CONTROL FOR PHOTOGRAPHIC CAMERAS
15 Claims, 2 Drawing Figs.

[52] U.S. Cl............................................................ 95/10,
95/53, 95/64
[51] Int. Cl..................................................... G03b 7/12,
G03b 9/06, G03b 9/58
[50] Field of Search............................................ 95/106, 5
Elec op, 64C

[56] References Cited
UNITED STATES PATENTS

| 2,978,970 | 4/1961 | Fahlenberg.................. | 95/10(C) |
| 3,205,798 | 9/1965 | Biber............................. | 95/10(C) |
| 3,283,681 | 11/1966 | Singer et al.................. | 95/10(C) |
| 3,442,190 | 5/1969 | Erickson...................... | 95/10(C) |
| 3,460,451 | 8/1969 | Starp et al.................... | 95/10(C) |

*Primary Examiner*—John M. Horan
*Assistant Examiner*—Joseph F. Peters, Jr.
*Attorney*—Michael S. Striker

ABSTRACT: An exposure control for photographic cameras wherein the exposure time is selected by the operator and the aperture size is determined automatically as a function of scene brightness and as a function of selected exposure time. The shutter (5,6) is closed by a delay circuit (79,80) with a delay which depends on the resistance of a selected one (75a) of a set of fixed resistors (75a—75z). The selected resistor is first connected by hand into the circuit of the exposure meter (30) for the diaphragm (46) to influence the aperture size in dependency of the desired exposure time, and the same selected resistor is thereupon automatically connected in the delay circuit on operation of the shutter release (41) to effect closing of the shutter.

INVENTOR.
GÜNTER PAWLIK

EXPOSURE CONTROL FOR PHOTOGRAPHIC CAMERAS

BACKGROUND OF THE INVENTION

The present invention relates to exposure controls for photographic cameras. More particularly, the invention relates to improvements in exposure controls which can furnish a wide range of exposure times and diaphragm apertures and wherein such exposure values can be determined by hand and/or automatically by further consideration of one or more additional factors, such as the filter factor, the sensitivity of film, the corrective factor for exposures against light and/or others.

SUMMARY OF THE INVENTION

One of the objects of the present invention is to provide a relatively simple, compact, inexpensive, reliable and versatile exposure control which can furnish a wide range of exposure times (for example, between 1/500 of a second and 16 seconds) and can be used to expose films of widely different sensitivities (for example, between 12—30 DIN).

Another object of my invention is to provide an exposure control which can be installed in many types of cameras and which can select the aperture size as a function of scene brightness as well as a function of preselected exposure time and/or one or more additional factors which must be considered in order to make exposures under widely different circumstances and with any one of several types of films.

The invention is embodied in an exposure control for photographic cameras which comprises adjustable diaphragm means and adjustable shutter means to respectively furnish a range of aperture sizes and a range of exposure times, built-in light meter means for adjusting the diaphragm means and including a first electric circuit having photosensitive receiver means for influencing the aperture size as a function of scene brightness, a second electric circuit for automatically closing the shutter means with a variable delay, variable resistor means arranged to furnish a range of resistances each of which is effective to produce a different delay and being normally connected in the first circuit so that its resistance influences the aperture size, and switch means for connecting the resistor means into the second circuit not later than on opening of the shutter means so that the resistance of the resistor means then determines the delay with which the shutter means closes to complete an exposure. The switch means preferably comprises a two-way switch which disconnects the variable resistor means from the first circuit and connects it into the second circuit in response to actuation of the shutter release.

The variable resistor means may comprise a set of fixed resistors each of which has a different resistance, and the exposure control comprises selector means movable by hand to connect a desired fixed resistor into the first circuit wherein the resistance of the thus selected fixed resistor influences the aperture size as a function of the desired exposure time.

The novel features which are considered as characteristic of the invention are set forth in particular in the appended claims. The improved exposure control itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENT

Figure 1:
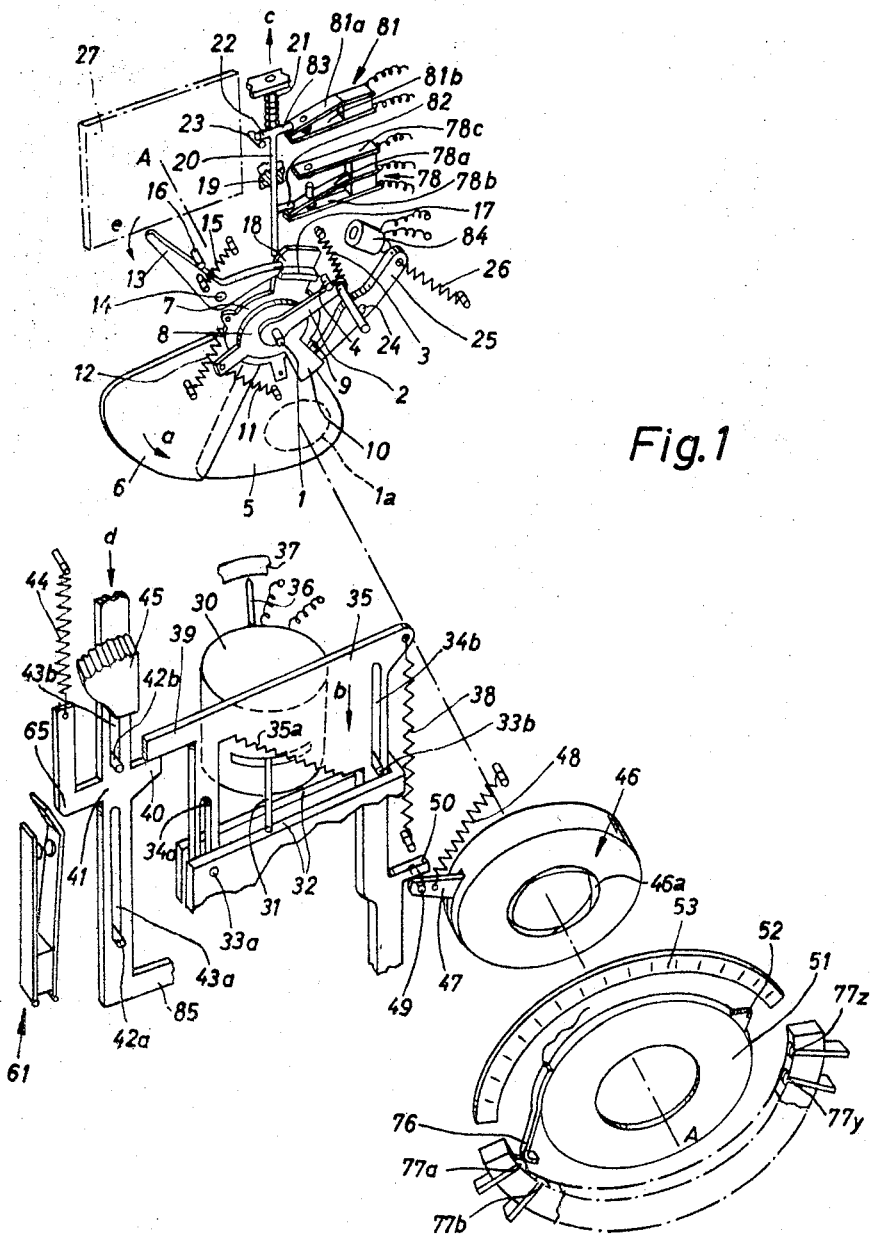
FIG. 1 is an exploded perspective view of an exposure control which embodies the invention.

FIG. 1 illustrates an exposure control including a shutter which comprises a shaft 1 connected to a cocking lever 2. The latter is biased by a return spring 3 so that it normally abuts against a fixed stop 4. Two setting rings 7, 8 are rotatably mounted on the shaft 1 and are respectively connected with shutter blades 5 and 6. Each of the rings 7, 8 has a bent over projection which extends into a notch of the corresponding shutter blade so that the blades share all angular movements of the respective rings. The leading setting ring 7 has a second projection 9 which extends into the path of the cocking lever 2 and can engage a projection 10 of the trailing setting ring 8. When the cocking lever 2 is turned in a clockwise direction, as viewed in FIG. 1, it cocks the leading setting ring 7 by way of the projection 9 and this projection cocks the trailing setting ring 8 by way of the projection 10. Return springs 12, 11 are provided to bias the setting rings 7, 8 to uncocked positions.

FIG. 1 shows the setting rings 7, 8 and the respective blades 5, 6 in cocked positions. The blade 5 extends across an opening 1a which can admit scene light to a window 27 for an unexposed film frame. The blade 6 is out of registry with the opening 1a. The optical axis of the camera is shown by the phantom line A-A.

The means for holding the setting rings 7, 8 in cocked positions comprises two blocking levers 13 and 25. The blocking lever 13 is turnable on a fixed pin 14 and is biased to the illustrated blocking position by a helical spring 15. The lever 13 then abuts against a fixed stop post 16 and one of its arms engages a projection 17 of the leading setting ring 7 to thus hold the ring 7 against rotation in the direction indicated by arrow a, i.e., the lever 13 then opposes the bias of the return spring 12. The leading setting ring 7 further carries an actuating member or trip 18 which resembles a cam and can shift a reciprocable follower 20 guided in fixed bearings 19 of the camera housing. The follower pin 20 is biased by a spring 21 and has an arm 22 which bears against a fixed stop 23 when the spring 21 is free to expand. The lower end portion of the follower pin 20 is then adjacent to the face of the trip 18.

The blocking lever 25 for the trailing setting ring 8 is biased by a helical spring 26 and is turnable about a fixed pivot pin 24. In the illustrated position, the blocking lever 25 extends into the path of the projection 10 on the trailing setting ring 8.

The exposure meter of the exposure control comprises a light meter 30 here shown as a moving coil instrument having an output member or needle 31 which is movable along a fixed back support or anvil 32. A detector or sensing member 35 is movable up and down, as viewed in FIG. 1, and its serrated tracking face 35a can clamp the needle 31 against the anvil 32. The detector 35 is provided with parallel slots 34a, 34b for fixed guide pins 33a, 33b. The light meter 30 has a second output member or index 36 which is movable in front of a fixed scale 37 having graduations indicating different aperture sizes. The detector 35 is biased downwardly by a helical spring 38 which tends to move it in the direction indicated by arrow b. FIG. 1 shows the detector 35 in retracted or idle position in which its extension or arm 39 abuts against an arm 40 provided on a shutter release trigger 41. This trigger 41 has elongated slots 43a, 43b for fixed guide pins 42a, 42b and is biased upwardly to a starting position by a strong helical return spring 44. A knob 45 on the trigger 41 can be depressed by hand in the direction indicated by arrow d to thereby move the arm 40 downwardly and to permit contraction of the spring 38 so that the tracking face 35a of the detector 35 can engage and can clamp the needle 31 against the anvil 32. The bias of the return spring 44 is stronger than that of the spring 38 so that the detector 35 automatically returns to the retracted position of FIG. 1 as soon as the knob 45 is released.

The exposure control also comprises an adjustable iris diaphragm 46 which can furnish a range of exposure apertures and is adjustable by an extension 50 of the detector 35. The diaphragm 46 has a set of vanes 46a which are coupled to a rotary setting ring (not shown) having an arm 47 which is biased to an initial position by a spring 48 and has a stud 49 which bears against the extension 50 of the detector 35. The exposure meter including the light meter 30 and detector 35 can adjust the diaphragm 46 as a function of scene brightness.

FIG. 1 further shows a manually operated selector 51 which is rotatable about the optical axis A-A and can be manipulated to effect manual selection of exposure time. The selector 51 has a pointer 52 which is movable along a fixed scale 53 having graduations indicating various exposure times.

Figure 2:
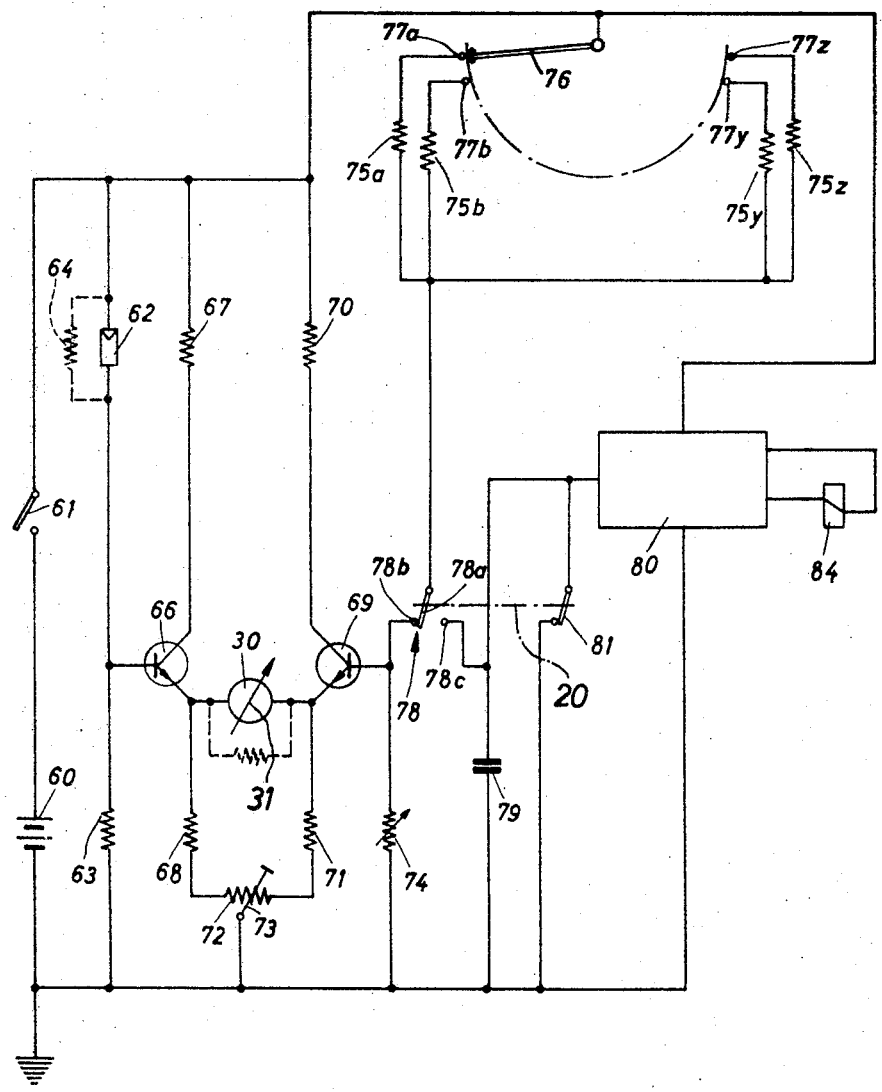
FIG. 2 is a diagram showing the electric circuit of the exposure control.

The electric circuit of the exposure control is shown in FIG. 2. This circuit includes a battery 60 or another suitable source of electrical energy connected in series with a master switch 61, with a photosensitive receiver 62 and a fixed resistor 63. A fixed resistor 64 (indicated by broken lines) can be connected with the parts 60—61 and 63 as a replacement for the photosensitive receiver 62. The master switch 61 is normally open and its movable contact is located in the path of an actuating member or trip 65 provided on the shutter release trigger 41 of FIG. 1. Thus, the master switch 61 closes automatically when the trigger 41 is moved by hand (arrow $d$) from the starting position shown in FIG. 1.

A junction between the photosensitive receiver 62 and fixed resistor 63 is connected with the base of a transistor 66. The collector and emitter of the transistor 66 are respectively connected with fixed resistors 67, 68. It will be seen that the collector and emitter form a voltage divider wherein the emitter constitutes the central tap. This tap is connected to one terminal of the moving coil instrument 30. The other terminal of the instrument 30 is connected to the emitter of a second transistor 69 whose collector is in series with a fixed resistor 70. A further fixed resistor 71 is in series with the emitter of the transistor 69, i.e., this emitter constitutes the central tap of a second voltage divider. The emitters of the transistors 66, 69 are connected to the terminals of an adjustable resistor 72 whose slider 73 is connected with one pole of the energy source 60.

The base of the transistor 69 can be connected with a further voltage divider which may include at least one variable resistor 74 and one of a series of fixed resistors $75a$, $75b$ ... $75y$, $75z$. The resistor 74 is adjustable by a manually operated member (not shown) so that its resistance indicates the sensitivity of film which is being used in the camera. In addition, the resistor 74 can be adjusted to account for the filter factor and/or for other factors which influence the exposure, for example, a correction made when the exposure is made with the camera lens facing the light source. Instead of employing the resistor 74 as a means for adjusting the exposure control in dependency on two or more factors, the camera may include one or more additional variable resistors in series with the resistor 74 and each adjustable to account for one of the aforediscussed factors. However, it is equally possible to adjust the exposure control so as to account for the sensitivity of film, filter factor or the like by replacing the resistor 63 with a variable resistor or with two or more series-connected variable resistors. Still further, the variable resistor 74 can be replaced by a set of fixed resistors each of which is connectable into the circuit independently of the other resistor or resistors, i.e., the resistor 74 can be replaced by a set of resistors similar to those shown at $75a$—$75z$.

The means for connecting one of the resistors $75a$—$75z$ into the circuit of FIG. 2 comprises a turnable selector contact 76 which conducts current and is movable into engagement with one of the terminals $77a$, $77b$ ... $77y$, $77z$ of the respective resistors. The number of resistors 75 corresponds to the number of exposure times which can be furnished by the exposure control. The selector contact 76 is connected to and can be rotated by the ring-shaped selector 51. A two-way switch 78 is connected between the resistors $75a$—$75z$ and the base of the transistor 69. This switch comprises two fixed contacts $78b$, $78c$ and a movable contact $78a$. When the contact $78a$ assumes the position shown in FIGS. 1 and 2, it engages the fixed contact $78b$ to thereby complete the circuit of the transistor 69 when the master switch 61 is closed. When the follower pin 20 of FIG. 1 is moved upwardly as indicated by arrow $c$, the movable contact $78a$ of the two-way switch 78 is caused to engage the fixed contact $78c$ whereby a selected one of the resistors $75a$—$75z$ is connected in series with a capacitor 79 of a switching circuit 80. Thus, the selected resistor (namely, the resistor $75a$ of FIG. 2) then forms with the capacitor 79 an R-C unit which controls the switching circuit 80. A control switch 81 can be actuated to bypass the capacitor 79. As shown in FIG. 1, the movable contact $81a$ engages the fixed contact $81b$ of the control switch 81 when the spring 21 maintained the arm 22 of the follower pin 20 in abutment with the stop 23. The pin 20 has two projections 82, 83 which respectively bear against the movable contacts $78a$, $81a$. The control switch 81 opens automatically when the contact $78a$ engages the contact $78c$. The switching circuit 80 controls the energization of an electromagnet 84 which in turn serves to move the blocking lever 25 away from engagement with the projection 10 of the trailing setting ring 8.

Prior to making an exposure, the operator of the camera which embodies the improved exposure control must adjust the resistor 74 in accordance with the sensitivity of film, filter factor, lighting conditions and/or other factors which influence the quality of exposures. It is clear that the resistor 74 can be adjusted automatically by a coding mark on the magazine for film, i.e., insertion of a fresh film magazine or cassette into the housing of the camera can bring about automatic adjustment of the resistor 74 as a function of film sensitivity. In the next step, the operator adjusts the position of the selector 51 to select the desired exposure time. Such selection is facilitated by the provision of scale 53 and pointer 52. As shown in FIG. 1, the selector contact 76 is coupled with the selector 51 so that it engages a selected one of the resistors $75a$—75 when the pointer 52 is moved into registry with a desired graduation on the scale 53.

The operator then depresses the knob 45 to move the trigger 41 against the opposition of the return spring 44. The trip 65 of the trigger 41 closes the master switch 61 so that a current can flow through the moving coil instrument 30. The angular position of the output members 31, 36 of the instrument 30 depends on the resistance of the resistor 74, on the resistance of that resistor ($75a$ in FIGS. 1 and 2) which is connected in the circuit by the selector 51, on the resistance of the resistor 63, and on the resistance of the photosensitive receiver 62 (i.e., on scene brightness). The resistance of the receiver 62 decreases if the intensity of scene light increases, i.e., the ratio of the resistances of the receiver 62 and resistor 63 changes in such a way that the potential at the base of the transistor 66 rises. Thus, a larger current flows through the emitter-collector circuit of the transistor 66 and the voltage at the corresponding terminal of the instrument 30 rises. In other words, the strength of current flowing through the instrument 30 changes and causes a change in the position of output members 31, 36.

If the resistance of the resistor 74 is changed, or if the operator replaces the resistor $75a$ with one of the resistors $75b$—75, and if the scene brightness remains unchanged, the position of the output members 31, 36 is changed again and the aperture size furnished by the vanes $46a$ of the diaphragm 46 is altered accordingly. The operator can readily determine the aperture size which is furnished by the diaphragm 46 by looking at the position of the output member 36 with reference to the scale 37.

As the operator continues to press the trigger 41 (arrow $d$ in FIG. 1), the detector 35 moves downwardly under the bias of the spring 38 and its tracking face $35a$ ultimately engages the output member 31 and presses it against the anvil 32. This stops the detector 35 and its extension 50 then maintains the arm 47 in an angular position which is a function of the position of the output member 31. The trigger 41 has a further projection 85 which engages the blocking lever 13 when the adjustment of the diaphragm 46 is completed. The projection 85 pivots the lever 13 in a counterclockwise direction (arrow $e$) and causes it to move away from the projection 17 so that the leading setting ring 7 can turn in the direction indicated by arrow $a$ because the return spring 12 is free to dissipate energy. The leading shutter blade 5 shares such movement of the setting ring 7 and moves away from the opening $1a$ so that the film frame in the window 27 receives light through the aperture defined by the diaphragm 46. As the leading setting ring 7 moves toward uncocked position, its trip 18 shifts the follower pin 20 in the direction indicated by arrow c whereby the projections 82, 83 of the follower pin actuate the switches 78, 81. The movable contact 78a of the switch 78 is free to move away from the fixed contact 78b and to engage the fixed contact 78c. The purpose of the control switch 81 which opens when the follower pin 20 moves in the direction of arrow c is to insure that the capacitor 79 discharges prior to completion of the delay circuit for the trailing shutter blade 6. The two-way switch 78 then disconnects the resistor 75a from the circuit of the light meter and the delay circuit including the circuit 80 and capacitor 79 is energized. All this takes place in response to engagement between the contacts 78a and 78c of the two-way switch 78.

The capacitor 79 is charged with a delay which depends on the resistance of the resistor 75a. The circuit 80 (which preferably comprises a set of transistors) energizes the electromagnet 84 with a delay which is a function of the resistance of the resistor 75a (or any other resistor selected by the selector contact 76 of the selector 51). The energized electromagnet 84 attracts the blocking lever 25 to move the latter away from the path of the projection 10 so that the trailing setting ring 8 can move the trailing blade 6 under the action of the return spring 11. The blade 6 turns in the direction indicated by arrow a and moves across the path of light coming from the aperture of the diaphragm 46 to cover the opening 1a so that the exposure is completed.

The improved exposure control can be modified in a number of ways without departing from the spirit of my invention. For example, the shutter shown in FIG. 1 can be replaced by other types of shutters, e.g., by a between-the-lens shutter or by a curtain type shutter. Furthermore, the light meter can be replaced by other means for adjusting the diaphragm 46 or an analogous diaphragm. All that counts is to insure that the aperture size selected prior to actuation of the two-way switch 78 remains unchanged during the next stages of operation of the exposure control, i.e., all the way to closing of the shutter. The set of resistors 75a, 75z can be replaced by a variable resistor; however, at this time, I prefer to use a different fixed resistor for each of a range of exposure times.

The improved exposure control can furnish a satisfactory combination of exposure time and aperture size even when the intensity of scene light is very low. This is achieved by the aforedescribed construction of the electric circuit which includes the instrument 30 and the two voltage dividers which are connected to the terminals of the instrument 30 by way of the transistors 66, 69.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

I claim:

1. An exposure control for photographic cameras, comprising adjustable diaphragm means and adjustable shutter means for respectively furnishing a range of aperture sizes and a range of exposure times; a first electric circuit for automatically closing said shutter means with a variable delay; a second electric circuit for adjusting said diaphragm means, including electronic amplifier means having two inputs and two outputs, a moving coil instrument connected between said outputs and operatively connected with said diaphragm means and voltage divider means connected with one of said inputs and including photosensitive receiver means exposed to scene light; variable resistor means arranged to furnish a range of resistances each of which is effective to produce a different delay; and switch means for normally connecting said variable resistor means with the other input of said amplifier means so that the resistor means influences the aperture size, and for connecting said resistor means into said first circuit not later than on opening of said shutter means so that the resistance of said variable resistor means then determines the delay with which the shutter means closes.

2. An exposure control as defined in claim 1, wherein said moving coil instrument comprises an output member movable to a plurality of positions as a function of scene brightness and the resistance of said variable resistor means, said second circuit further comprising detector means for adjusting said diaphragm means in dependency on the position of said output member.

3. An exposure control as defined in claim 1, further comprising shutter release means, said switch means being actuated to connect said variable resistor means into said second circuit on operation of said shutter release means.

4. An exposure control as defined in claim 3, further comprising follower means movable from a first to a second position on operation of said shutter release means to thereby actuate said switch means.

5. An exposure control as defined in claim 1, wherein said variable resistor means comprises a set of fixed resistors each having a resistance corresponding to a different delay, and further comprising selector means for connecting a desired fixed resistor into said second circuit so that said desired resistor is thereupon connected into said first circuit by said switch means.

6. An exposure control as defined in claim 1, wherein said switch means is arranged to complete said first circuit in response to connection of said variable resistor means into said first circuit.

7. An exposure control as defined in claim 1, wherein said first circuit comprises capacitor means and control switch means in parallel with said capacitor means, said control switch means being respectively closed and open when said variable resistor means is respectively connected in said second and first circuits.

8. An exposure control as defined in claim 7, wherein said capacitor means and said variable resistor means constitute an RC unit of said first circuit which effects closing of said shutter means with a delay determined by the interval required for charging of said capacitor means on opening of said control switch means.

9. An exposure control as defined in claim 8, further comprising common actuating means for said switch means.

10. An exposure control for photographic cameras, comprising adjustable diaphragm means and adjustable shutter means for respectively furnishing a range of aperture sizes and a range of exposure times; light meter means for adjusting said diaphragm means, including a first electric circuit having photosensitive receiver means for influencing the aperture size as a function of scene brightness and first variable resistor means, and a moving coil instrument having two terminals, an output member movable to a plurality of positions and detector means for adjusting said diaphragm means in dependency on the position of said output member, said receiver means being connected with one terminal of said instrument; a second electric circuit for automatically closing said shutter means with a variable delay; second variable resistor means arranged to furnish a range of resistances each of which is effective to produce a different delay and being normally connected in said first circuit so that its resistance influences the aperture size, said first and second variable resistor means forming part of a voltage divider connected with the other terminal of said instrument; and switch means for connecting said second variable resistor means into said second circuit not later than on opening of said shutter means so that the resistance of said second variable resistor means then determines the delay with which the shutter means closes.

11. An exposure control as defined in claim 10, wherein said first variable resistor means is adjustable as a function of at least one factor which influences the exposure.

12. An exposure control as defined in claim 10, wherein said first circuit further comprises a first transistor connected between said second variable resistor means and said other terminal and a second transistor connected between said receiver means and said one terminal.

13. An exposure control as defined in claim 12, wherein said first circuit further comprises third resistor means forming with said receiver means a second voltage divider having a tap connected with the base of said second transistor.

14. An exposure control as defined in claim 12, wherein said first circuit further comprises a plurality of additional resistor means in series with the collectors and emitters of said transistors.

15. An exposure control as defined in claim 12, wherein said first circuit further comprises third variable resistor means connected between the emitters of said transistors.